(12) United States Patent
Lenormand et al.

(10) Patent No.: US 6,545,787 B1
(45) Date of Patent: Apr. 8, 2003

(54) METHOD OF COMMUNICATION BETWEEN EARTH STATIONS USING A CONSTELLATION OF SATELLITES

(75) Inventors: Régis Lenormand, Blagnac (FR); Claude Argagnon, Tournefeuille (FR); Jean Bouin, Toulouse (FR); Gérald Chretien, Jouy en Josas (FR); Luc Delamotte, Toulouse (FR); Laurent Roullet, Toulouse (FR); Philippe Voisin, Tournefeuille (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/292,336

(22) Filed: Apr. 15, 1999

(30) Foreign Application Priority Data

Apr. 16, 1998 (FR) .............................. 98 04750

(51) Int. Cl.⁷ .............................. H04B 10/00
(52) U.S. Cl. ................. 359/172; 359/133; 359/155; 359/173
(58) Field of Search ................ 355/172, 173, 355/133, 152

(56) References Cited

U.S. PATENT DOCUMENTS 4,912,656 A * 3/1990 Cain et al. .................. 364/514
5,129,095 A * 7/1992 Davis et al. ................ 455/12.1
5,825,325 A * 10/1998 O'Donovan et al. ........ 342/353
5,870,216 A * 2/1999 Brock et al. ................. 359/172
5,909,299 A * 6/1999 Sheldon et al. ............. 359/172
6,002,916 A * 12/1999 Lynch ........................ 455/13.1

FOREIGN PATENT DOCUMENTS

EP 0 780 998 A2 6/1997

* cited by examiner

Primary Examiner—Leslie Pascal
Assistant Examiner—Dzung Tran
(74) Attorney, Agent, or Firm—Sughrue Mion, PLLC

(57) ABSTRACT

The invention concerns a method of communication between ground stations via satellites traveling around the Earth and forming part of a constellation overflying at least a major portion of the Earth, each ground station communicating during a particular time with a given satellite of the constellation. Two ground stations communicate via respective given satellites with which the stations are respectively communicating. To minimize the control means on board each satellite, the two satellites communicate via a predetermined communications link. A link of the above kind generally comprises one or more predetermined satellites.

14 Claims, 2 Drawing Sheets

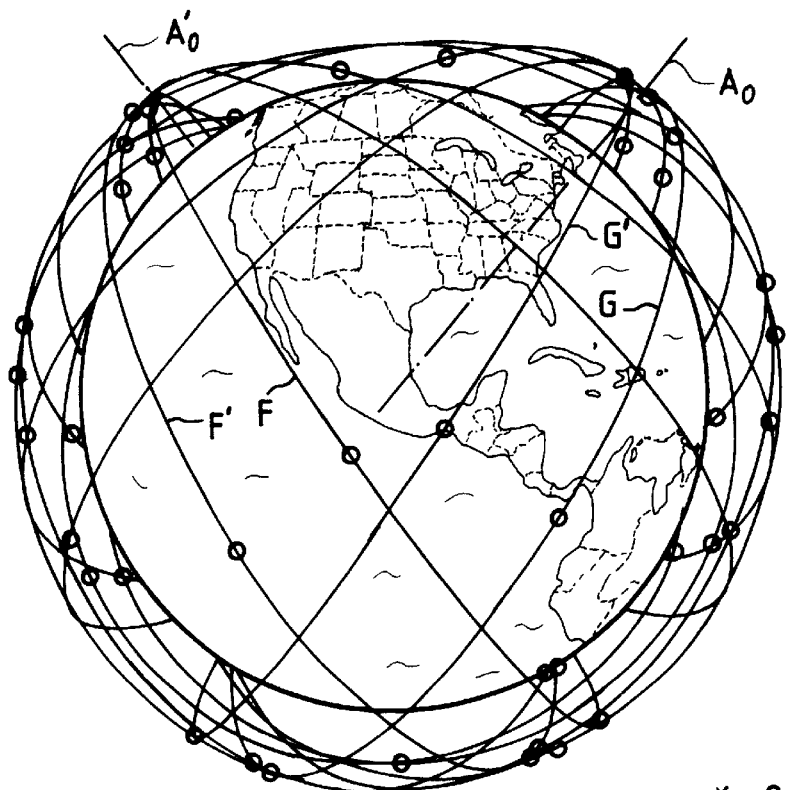
FIG_1
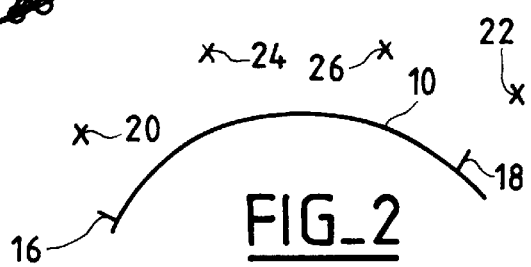
FIG_2
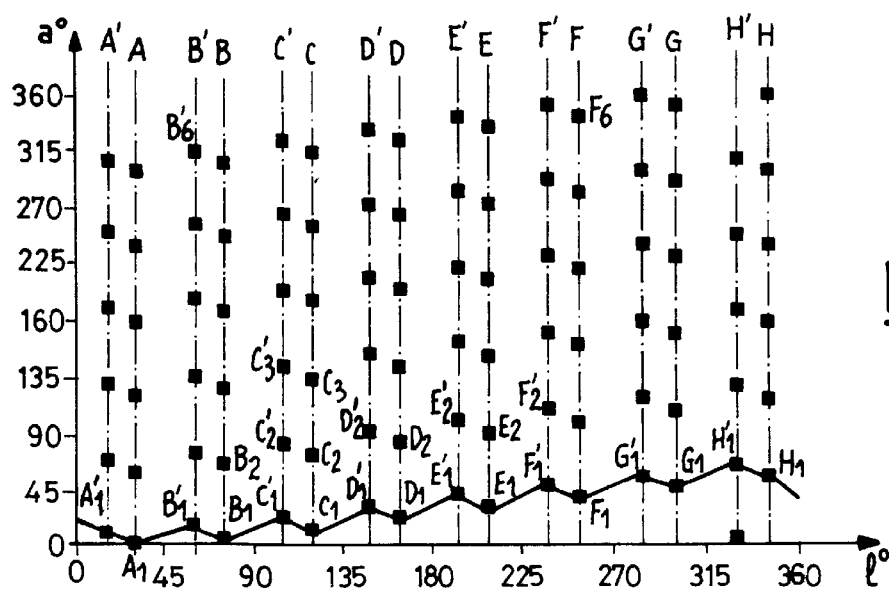
FIG_3

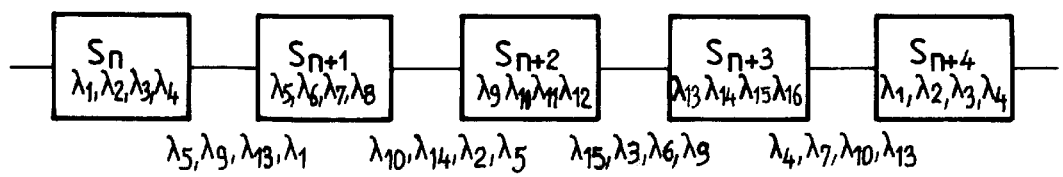
FIG_4
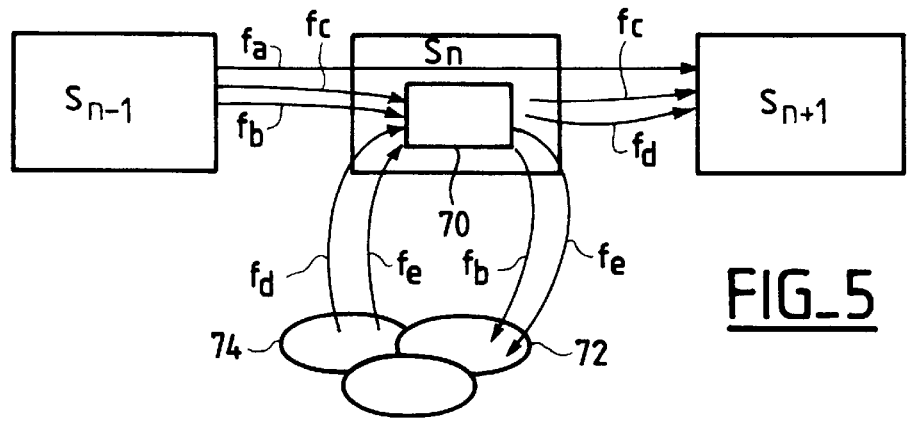
FIG_5
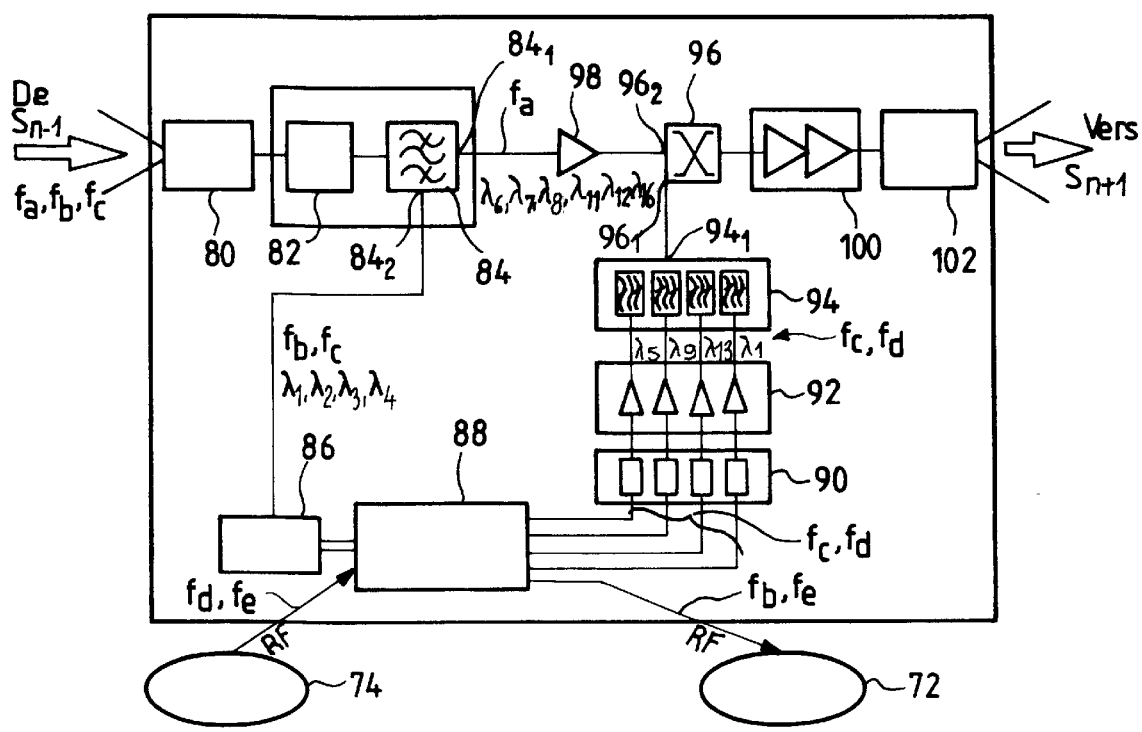
FIG_6

METHOD OF COMMUNICATION BETWEEN EARTH STATIONS USING A CONSTELLATION OF SATELLITES

The invention concerns a method of communication between stations or users on the ground via satellites.

BACKGROUND OF THE INVENTION

The ever-increasing bit rate of telecommunications leads to the development of diverse types of communication, in particular communications relayed by satellites. A number of communications systems of this type are planned. Such systems generally use constellations of satellite in "low Earth orbit" or "medium Earth orbit". In such a constellation, a plurality of satellites follow the same orbit at an altitude in the range 1,000 km to 1,500 km above the surface of the Earth, for example, and the constellation includes a plurality of orbits, usually in the form of pairs of closely spaced orbits. The set of orbits or pairs of orbits covers most of the surface of the Earth where communications are useful.

An "Internet" type system has already been proposed for satellite communication between users virtually anywhere on the Earth in which information is transmitted between two distant users using satellite links. In the system concerned the number of satellites and their distribution are such that each user can communicate directly with a satellite at any time and information is transmitted between two users by means of the satellites with which they communicate directly. The satellites communicating directly with the users are linked by other satellites of the constellation. The choice of the intermediate satellites, in other words the routing of the information, is handled individually for each call using control means on board each satellite.

A telecommunications system of the above kind necessitates a high satellite density. The system is therefore costly. Controlling routing on board each satellite further increases the cost of the system.

There are other satellite telecommunications systems in which, within a particular terrestrial area, communications are effected via the only satellite passing over that area. When the satellite leaves the area concerned, another satellite takes over from it. In that system users in the same area communicate via a single satellite and users in different areas must communicate using means other than the satellites. The system is extremely simple but its capacity is limited.

Document US 4 912 656 is illustrative of the prior art and describes onboard processing which makes the communications system very costly. Document EP 0 780 998 is also illustrative of the prior art but does not provide for any simply processing of links between satellites.

OBJECTS AND SUMMARY OF THE INVENTION

The method of the invention enables communication between distant stations or users on the ground via satellites and uses a relatively low cost communications system.

In the method of the invention, to set up communication between two distant stations or users on the ground via a constellation of satellites, the link between the satellite communicating directly with a first station (or user) and the satellite communicating directly with a second station (or user) is at all times effected via at least one predetermined link.

In other words, the routing of information between satellites is predetermined. There is therefore no need to provide complex control means onboard each satellite.

In addition, in the method of the invention, communication between satellites is optical. Finally, to obtain a high information bit rate, there is provision for using more than one wavelength. The plurality of wavelengths can be exploited for addressing one satellite from another. For example, a message carried by a wavelength $\lambda_n$ can be addressed to the $n^{th}$ satellite preceding the transmitter satellite.

The term "predetermined link" means that communication between the satellites communicating directly with the ground stations is effected via one or more predetermined satellites. If the satellites communicating directly with the ground stations are at a sufficiently short distance from each other, communication can be effected without any intermediary.

The links between satellites are pre-programmed, for example. The links can be controlled by a ground station, which further minimizes the onboard control means.

The links between satellites can be predetermined because the position of each satellite is known at all times. Which satellites can communicate with each other is therefore known at all times because their positions and the distances between them are known.

During a call, the link between two stations or users on the ground may be modified. Because of the movement of the satellite, each station continues to communicate directly with a satellite for a limited time. Another predetermined link is set up when another satellite takes over direct communication.

In a preferred embodiment of the invention each link between two satellites is associated with at least one other predetermined link so that the latter replaces the first link should it fail, the first link having priority. The second link is advantageously a complementary link, meaning that the combination of the first and second links forms a ring around the Earth.

BRIEF DESCRIPTION OF THE DRAWINGS

Other features and advantages of the invention will become apparent from the description of certain embodiments of the invention given hereinafter with reference to the accompanying drawings, in which:

FIG. 1 is a diagram showing the Earth and a constellation of communications satellites, FIG. 2 is a simplified diagram showing how a link of the invention is established between two ground stations, FIG. 3 is a diagram showing in projected form communications links of the invention between satellites, FIG. 4 is a diagram explaining one means of optical communication between satellites, FIG. 5 is a diagram showing communication between a ground station and a satellite and between that satellite and two other nearby satellites, and FIG. 6 is a diagram of the onboard equipment of a satellite that is part of a system of the invention.

MORE DETAILED DESCRIPTION

The communication method of the invention uses a constellation of satellites in non-geosynchronous orbit around the Earth 10 (FIG. 1).

In the example, the constellation comprises 96 satellites in sixteen orbits AA', BB', . . . , HH' (FIG. 3) inclined to the polar axis. There are six satellites in each orbit. The orbits are at an altitude of approximately 1,500 km above the surface of the Earth.

The orbits form eight pairs of orbits. Four pairs are inclined in one direction relative to the polar axis and the other four pairs are inclined at the same angle to the polar axis. The first set of four pairs of orbits is therefore evenly distributed around an axis $A_0$ passing through the center of the Earth and inclined to the polar axis and the second set of four pairs of orbits is evenly distributed about an axis $A'_0$ symmetrical to the axis $A_0$ with respect to the polar axis. The cross-overs of the orbits near the poles lie on spherical caps centered on the axes $A_0$ and $A'_0$.

FIG. 3 shows the position of the 96 satellites of the constellation at a given time. The ascending nodes in each pair of orbits are separated by 15°.

The ascending node is a parameter defining an orbit. It is the longitude where the orbit concerned intercepts the equatorial plane when the satellite is moving from south to north.

In the FIG. 3 diagram the abscissa axis plots the longitude 1 of the ascending nodes, the 0° (and 360°) longitude corresponding to the Greenwich meridian. The ordinate axis plots the average anomaly a, i.e. the position of the satellite in its orbit expressed by the angular offset (relative to the center of the Earth) from the ascending node. Accordingly, a satellite with 0° (or 360°) anomaly is in the equatorial plane. A satellite with a +90° anomaly is as close as possible to the North Pole.

In FIG. 3 each satellite is identified by the name of its orbit A', A, B', B, . . . , H', H and by an index corresponding to its rank within that orbit, rank 1 indicating a zero anomaly or the smallest positive anomaly.

The constellation of satellites sets up links between distant ground stations. The FIG. 2 diagram shows the Earth 10 and two stations 16 and 18 the distance between which is such that they cannot communicate via the same satellite.

At any given time each station is communicating with a particular satellite which is visible from the station at that time. In the FIG. 2 diagram station 16 is communicating with satellite 20 and station 18 is communicating with satellite 22. Here "communicating" means that the station is receiving messages directly from the corresponding satellite and transmitting messages directly to that satellite.

In accordance with the invention, stations 16 and 18, and thus satellites 20 and 22, communicate via other satellites of the constellation, namely satellites 24 and 26, which are predetermined satellites in the sense explained above. In other words, communication between satellites 20 and 22 is not based on criteria determined by the communication itself, for example the congestion of a link, but is predetermined by pre-programming it or by commanding it from a ground station (not shown).

For simplicity, satellites 20, 22, 24 and 26 are shown in the same plane in FIG. 2. In general they are not in the same orbit (see below).

The predetermined link via satellites 24 and 26 between satellites 20 and 22 is generally retained for as long as ground stations 16 and 18 communicate directly with satellites 20 and 22. Two other satellites then take over from satellites 20 and 22 with a new link via other predetermined satellites, as explained below with reference to FIG. 3.

It should nevertheless be noted at this point that two close-together users in direct line of sight of the same satellite, communicate with each other via that satellite. Also, if the two satellites are at a sufficiently short distance apart, they can communicate directly.

In the example shown in FIG. 3 satellite $B'_1$ is caused to communicate with satellite $F_1$. In this case the predetermined link between $B'_1$ and $F_1$ is as follows: $B'_1$, $B_1$, $C'_1$, $C_1$, $D'_1$, $D_1$, $E'_1$, $E_1$, $F'_1$ and $F_1$. There is also a complementary link on the ring around the Earth, namely: $B'_1$, $A_1$, $A'_1$, $H_1$, $H'_1$, $G_1$, $G'_1$ and $F_1$.

The satellites move around their orbit (from the bottom to the top in FIG. 3) and after a certain time the ground stations communicating via satellites $B'_1$ and $F_1$ lose sight of those satellites. Communication is then via satellites which are in their field of view, for example satellites $B'_6$ and $F_6$ (the following satellites in the same orbits in this example). In this case, communication between the satellites taking over is via a link between satellites analogous to the link $B'_1$, $F_1$ described above.

The link in the form of a ring, that is to say from $B'_1$ to $F_1$ and from $F_1$ to $B'_1$, provides redundancy alleviating possible failure of one of the satellites on a link.

Redundancy can instead be obtained in a manner other than by a ring around the Earth, for example by the link $B'_1$, $B_2$, $C'_2$, $C_2$, $D'_2$, $D_2$, $E'_2$, $E_2$, $F'_2$, $F_1$. In any event, it is important for the redundant link to be predetermined.

In a different embodiment, the redundancy is used to forward calls of different kinds, for example calls with different bandwidths or different information bit rates.

Although a constellation of satellites with orbits inclined to the poles has been described hereinabove, it goes without saying that the invention is not limited to this situation. It applies also when the orbits are polar orbits.

In one example the links between satellites are optical links. The necessary multiplexing of information is effected by choosing a plurality of optical carrier wavelengths.

To minimize processing on board each satellite, the optical wavelength carrying a message represents the final address of the call (i.e. the identity of the satellite).

The example used here to explain the multiplexing system relates to transmission using sixteen different optical wavelengths divided between four satellites. Each satellite n can process four wavelengths and, without processing them, can forward three wavelengths to satellite n+1, two wavelengths to satellite n+2, and one wavelength to satellite n+3. Also, the satellite transmits on four wavelengths addressed to satellites n+1, n+2, n+3 and n+4, respectively, the wavelength addressed to satellite n+4 corresponding to a wavelength processed by satellite n.

Thus a communications relay is constituted by groups of four consecutive satellites.

FIG. 4 illustrates this example and shows the distribution of the sixteen wavelengths $\lambda_1$ to $\lambda_{16}$. In the figure satellites $S_n$, $S_{n+1}$, $S_{n+2}$, $S_{n+3}$ and $S_{n+4}$ are represented by blocks. The wavelengths indicated in each block correspond to the wavelengths addressed to the satellites concerned and the wavelengths indicated between two satellites correspond to the wavelengths used for communication between the satellite to the left of the wavelengths and the next four satellites.

Accordingly, satellite $S_n$ receives wavelengths $\lambda_1$, $\lambda_2$, $\lambda_3$ and $\lambda_4$ from four preceding satellites in the chain, i.e. satellites n−4 to n−1 (not shown). The wavelengths $\lambda_1$, $\lambda_2$, $\lambda_3$ and $\lambda_4$ are processed by satellite $S_n$.

Without processing them, satellite $S_n$ forwards wavelengths $\lambda_6$, $\lambda_7$, $\lambda_8$, $\lambda_{11}$, $\lambda_{12}$ and $\lambda_{16}$. Wavelengths $\lambda_6$, $\lambda_7$ and $\lambda_8$ are addressed to satellite $S_{n+1}$, $\lambda_{11}$ and $\lambda_{12}$ to $S_{n+2}$ and $\lambda_{16}$ to satellite $S_{n+3}$.

Finally, satellite $S_n$ transmits on four wavelengths addressed to the next four satellites. These are wavelength $\lambda_5$ addressed to $S_{n+1}$, $\lambda_9$ to $S_{n+2}$, $\lambda_{13}$ to $S_{n+3}$ and $\lambda_1$ to $S_{n+4}$.

Accordingly, in this example, a satellite can send a message to any other satellite in front of it (or behind it).

In this example with 16 wavelengths, if satellite $S_n$ is to communicate with satellite $S_{n+k}$, the message satellite $S_n$ sends to satellite $S_{n+k}$ is generally relayed k/4 times if k is a multiple of 4 or a number of times equal to the integer immediately above k/4 if k is not a multiple of 4.

To determine whether a message received by a satellite on a particular wavelength must be transmitted to the ground or relayed, each satellite carries a routing unit (see below) which determines the destination of the message according to its content.

FIG. 5 shows the streams of data between satellite $S_n$ and the previous satellite $S_{n-1}$ and the next satellite $S_{n+1}$ together with the stream of data between it and the ground station with which it is communicating. This diagram shows that satellite $S_n$ forwards a first data stream $f_a$ without processing it, in other words the stream $f_a$ from satellite $S_{n-1}$ is forwarded without being processed by satellite $S_n$ to satellite $S_{n+1}$.

Satellite $S_n$ also receives a data stream $f_b$ from satellite $S_{n-1}$ and forwards it to a ground station 72 via a communications unit 70.

A stream $f_c$ from satellite $S_{n-1}$ is received by switching device 70 and retransmitted to satellite $S_{n+1}$. In this case, satellite $S_n$ is a regenerative relay. It is the content of each message which determines if the message at $\lambda_1, \lambda_2, \lambda_3$ and/or $\lambda_4$ must be transmitted to the ground station or retransmitted "downstream" to another satellite on wavelength $\lambda_5, \lambda_9, \lambda_3$ and $\lambda_1$.

Satellite $S_n$ also receives information from a ground station 74 (which may be co-located with station 72). This information forms a stream $f_d$ which after processing in unit 70 is forwarded to satellite $S_{n+1}$.

Finally, satellite $S_n$ establishes communication between sending station 74 and receiving station 72. Thus the stream $f_e$ is transmitted from station 74 to satellite $S_n$ and, after passing through the unit 70, is retransmitted to receiving station 72.

One embodiment of the means on board satellite $S_n$ for executing the functions described with reference to FIGS. 4 and 5 is now described with reference to FIG. 6.

The data streams $f_a, f_b, f_c$ from satellite $S_{n-1}$ are received by a telescope 80. As explained above with reference to FIG. 4, the data stream $f_a, f_b, f_c$ comprises ten wavelengths, namely wavelengths $\lambda_1$ to $\lambda_4, \lambda_6$ to $\lambda_8, \lambda_{11}, \lambda_{12}$ and $\lambda_{16}$.

The data then passes through an optical preamplifier 82 and a filter 84 which has two outputs, an output $84_1$ for the wavelengths corresponding to the stream $f_a$ relayed transparently, i.e. $\lambda_6, \lambda_7, \lambda_8, \lambda_{11}, \lambda_{12}$ and $\lambda_{16}$, and an output $84_2$ for the streams $f_b$ and $f_c$ at the wavelengths $\lambda_1, \lambda_2, \lambda_3$ and $\lambda_4$.

The output $84_2$ is connected to a receiver 86 receiving wavelengths $\lambda_1$ to $\lambda_4$ and converting them into a stream of digital data that is processed and routed by a routing unit 88. The routing unit forwards the stream $f_b$ via a radio link RF to station 72. The routing unit also forwards the stream $f_c$ to the optical output to satellite $S_{n+1}$.

The routing unit 88 also includes an input receiving the streams $f_d, f_e$ from station 74. Four digital outputs of the routing unit 88 forward the stream $f_d$ at the same time as the stream $f_c$. The digital streams $f_c$ and $f_d$ are encoded by a four-channel encoder 90, the number of channels being equal to the number of digital outputs of the routing unit 88.

For transmission quality to be independent of the number of relay satellites, the robustness of the error correction encoding depends on the number of satellites preceding the target satellite. In other words, the robustness of the error correction encoding is proportional to the number of relay satellites.

The digital signals on each of the four channels of the encoder 90 modulate four lasers 92 transmitting on four wavelengths corresponding to the target satellites, i.e. $\lambda_5$ to $S_{n+1}, \lambda_9$ to $S_{n+2}, \lambda_{13}$ to $S_{n+3}$ and $\lambda_1$ to $S_{n+4}$.

The optical signals of the streams $f_c$ and $f_d$ are multiplexed by an optical multiplexer 94 with four input channels and one output $94_1$ connected to a first input $96_1$ of an optical coupler 96.

The output $84_1$ of the filter 84 that delivers the stream $f_a$ at wavelengths $\lambda_6, \lambda_7, \lambda_8, \lambda_{11}, \lambda_{12}$ and $\lambda_{16}$ is connected to the input of an optical amplifier 98 whose output is connected to another input $96_2$ of coupler 96.

The output of optical coupler 96 is connected to the input of a telescope 102 via an optical amplifier 100.

The telescope 102 transmits to satellite $S_{n+1}$.

Note that the inputs of coupler 96 are connected by optical fibers to the units on their input side, in other words to multiplexer 94 and amplifier 98. Similarly, filter 84 is connected to amplifier 98 by optical fibers, as are coupler 96 and amplifier 100 and as are amplifier 100 and telescope 102.

Note that processing onboard satellite $S_n$ is minimized.

What is claimed is:

1. A method of communication between ground stations via satellites traveling around the Earth and forming a part of a constellation overflying a major fraction of the Earth, comprising:

one of said ground stations communicating, during a particular time, with a predetermined one of said satellites of the constellation; and the ground stations communicating with each other via respective ones of said satellites with which each of said stations are respectively communicating, wherein communication between said two satellites is effected through the intermediary of a predetermined communications link, the links between satellites are of the optical type, and communication is effected at a plurality of optical carrier wavelengths, one of said optical carrier wavelengths being associated with said predetermined satellite so that messages are transmitted by said predetermined satellite to another satellite on the same optical carrier wavelength.

2. A method according to claim 1, wherein messages are transmitted by said predetermined satellite to subsequent satellites in the predetermined link using a given number K of optical carrier wavelengths, the first wavelength being used to carry messages to the next satellite in the link and the $i^{th}$ wavelength of that series being used to carry messages to the $i^{th}$ satellite in the link after the transmitting satellite.

3. A method according to claim 1, wherein at least one second predetermined link is provided for communication between the given two satellites.

4. A method according to claim 3, wherein said predetermined communications link and said at least one second predetermined link form a link extending around the Earth.

5. A method according to claim 3, wherein communication between the given two satellites via the first predetermined link has priority.

6. A method according to claim 5, wherein the given two satellites communicate via the second predetermined link if the first predetermined link fails.

7. A method according to claim 1, wherein each satellite can also be used for communications between ground stations within its field of view.

8. A method according to claim 1, wherein the links between ground stations and satellites are radio links.

9. A method according to claim 1, wherein messages between the given two satellites are protected by error correcting codes and wherein the robustness of error correcting encoding is proportional to the number of satellites in the predetermined link.

10. The method of claim 1, further comprising:
receiving an optical carrier wavelength of a received message at a given satellite; and determining whether the optical carrier wavelength of the received message corresponds with the optical carrier wavelength associated with the given satellite.

11. The method of claim 10, further comprising:

transmitting the received message to a next satellite when the optical carrier wavelength of the received message is different from the optical carrier wavelength associated with the given satellite.

12. The method of claim 11, further comprising:

transmitting the received message to a ground station when the optical carrier wavelength of the received message is the same as the optical carrier wavelength associated with the given satellite.

13. The method of claim 1, wherein a plurality of different wavelengths are used to uniquely address and identify each satellite in said constellation of satellites.

14. The method of claim 1, wherein each of said links between a first satellite and an immediately adjacent second satellite includes a subset of said plurality of optical carrier wavelengths.

\* \* \* \* \*